United States Patent Office 3,445,263
Patented May 20, 1969

3,445,263
PRESSURE SENSITIVE ADHESIVE TAPE
Bradley B. Alexander, Wilmington, Del., assignor to Hercules Incorporated, Wilmington, Del., a corporation of Delaware
No Drawing. Filed May 24, 1966, Ser. No. 552,417
Int. Cl. B44d 1/092
U.S. Cl. 117—47          5 Claims

ABSTRACT OF THE DISCLOSURE

Pressure sensitive adhesive tapes are prepared by hot-melt coating of films or ribbons of high density polyethylene having molecular weight of at least 1,000,000. A preferred pressure sensitive adhesive is based on ethylene—vinyl acetate copolymer and hydrogenated wood rosin esters.

---

This invention relates to pressure sensitive adhesive tape and to a process of preparing the same.

There are, available on the market today, a great number of pressure sensitive adhesive tapes designed to serve a great many needs. Most of these tapes comprise a pressure sensitive adhesive coated upon a paper, cloth, synthetic plastic or other flexible substrate. For specified purposes, each of these known tapes has substantial utility. However, in industrial applications where the need is for a tape of exceptional durability, as under abrasive conditions, no completely satisfactory combination of substrate and adhesive has yet been developed. Such industrial applications include, for example, areas of abrasion on high speed packaging machines.

At the present time the majority of the pressure sensitive adhesive tapes are prepared by coating the adhesive onto the backing material from solutions. Solution coating, however, is an inherently expensive process inasmuch as the solvent must either be recovered or lost to the surrounding atmosphere. Either alternative involves expense which could advantageously be eliminated. These expenses can be eliminated by a system where the coating is applied in the form of a melt.

It is known that films and sheets of oriented polyethylene possess reasonably good durability under abrasive conditions. Excellent tapes based on this substrate have been prepared by means of solution coating. However, in attempting to prepare pressure sensitive tape based on such films, by means of hot melt coating, serious difficulties have been encountered, due primarily to the thermal instability of the substrate at melt coating temperatures. Films of the thickness usually contemplated for use in flexible adhesive tapes tend to become badly distorted and even to melt under the temperatures usually encountered in melt coating operations, which temperatures are usually above the temperature at which oriented polyethylene begins to lose its orientation and shrink back to its preorientation configuration. Since melt coating is the preferred method of applying the adhesive to the substrate, this tendency seriously inhibits the use of oriented polyethylene film or sheet as the substrate for pressure sensitive tape.

The best synthetic plastic substrate found to date for melt coated pressure sensitive tape has been poly(tetrafluoroethylene). Due to its very high melting point, it can readily be coated with a pressure sensitive adhesive by the melt coating technique. However, tapes based upon poly(tetrafluoroethylene) are not always as good in their abrasion resistance as would be liked.

It has now been found that a melt-coated pressure-sensitive adhesive tape based upon a polyethylene substrate and having extremely high abrasion resistance can be prepared if the polyethylene substrate comprises a film or sheet of high density polyethylene having a molecular weight of about 1,000,000 or higher, measured by intrinsic viscosity. Accordingly, the instant invention relates to a pressure-sensitive adhesive tape comprising a substrate of high density polyethylene having a molecular weight of at least about 1,000,000, coated with a pressure sensitive hot melt adhesive.

By high density polyethylene is meant polyethylene whose density is at least about 0.94. Such polyethylene can be produced by any of the known methods. The principal methods are the transition metal catalyzed process and the so-called Phillips process employing chromium oxide as a catalyst. Each of these methods produces a crystalline, high density polymer at a low operating pressure. By proper control of the operating conditions, high density polymers can be prepared having molecular weight anywhere in the range from about 40,000 to about 4,000,000 and even higher.

The common high density polyethylene of commerce is polymerized to a maximum molecular weight of less than 1,000,000. For example, high density polyethylene normally supplied for production of films, blown bottles and the like has a weight average molecular weight of around 150,000. As the molecular weight increases significantly above this point, the melt viscosity of the polymer also increases significantly. With a sufficiently great increase in the molecular weight a point is reached, at the molecular weight of about 1,000,000, at which the polymer becomes virtually intractable, viz, the melt viscosity is so high that normal extrusion operations cannot be carried out. Such high molecular weight, virtually intractable polymer is difficult to mold or extrude, and in fact requires special procedures to do so. For example, this material can be extruded, if at all, only with great difficulty, and a preferred method of forming it is by compression molding.

However, this factor, the high melt viscosity, makes this polymer desirable as a backing for melt coated, pressure sensitive tape. As stated, one of the drawbacks encountered in melt coating standard polyethylene film with pressure sensitive adhesives is the tendency for the film to distort upon application of the hot melt coating. Due to the very high melt viscosity and the high molecular weight of the polymers of the instant invention, the tendency for the polymer to distort at the melt coating temperature is negligible. Even though this polymer, during the roll coating, might become hot enough to melt, its high melt viscosity prevents it from flowing or otherwise distorting during the short exposure to melting temperature as it is drawn through the coating equipment. The polymer can tolerate temperatures up to at least about 205° C. without harmful distortion, if the exposure time is limited to a maximum of about 15 seconds.

In addition, the high molecular weight, high density polyethylene is extremely tough and abrasion resistant even without orientation. The common high density polyethylene of commerce is known to be of high abrasion resistance. However, the high molecular weight polymer of this invention has even greater abrasion resistance, significantly better in this regard than polytetrafluoroethylene, generally regarded heretofore as the most durable of tape substrates under abrasive conditions.

The high density, high molecular weight polyethylene film or sheet of this invention can be prepared by any convenient means. However, in view of the high melt viscosity of the polymer, it is preferred to form the film by a process of skiving layers from a billet. In this process, a cylindrical billet of the polyethylene is formed by sintering granules of the polymer in a cylindrical mold under high pressure. The cylindrical billet is placed in a lathe or like mounting means and a film of the desired thickness is taken therefrom by rotating the billet about its long axis and continuously shaving off a layer with a continuously, radially advancing cutting blade. Using this technique, it is possible to prepare films having thickness ranging from about 2 mils to about 100 mils. Film of any thickness within this range is useful so long as it exhibits the needed flexibility for a tape. Thicknesses between about 5 mils and 20 mils are generally preferred.

In order to render the polyethylene film surface receptive to the adhesive coating and to assure a good bond between film and coating, it is desirable to treat its surface. This can be accomplished in any of a number of ways. For example, chemical treatments can be used as shown in U.S. Patents 2,715,075–076–077 to Wolinski, inter alia; the film can be flame treated, as shown in U.S. 2,632,291 and 2,746,084 to Kreidl; or it can be irradiated by means of high energy radiation as disclosed, inter alia in U.S. 2,914,450 to Hammerfahr et al. The most preferred way of treating the film surface, however, is by means of high voltage corona discharge. A very useful process for accomplishing this treatment is disclosed by Traver in U.S. 3,018,019. Briefly, this method comprises passing the film to be treated between spaced electrodes forming the opposite sides of a treatment zone and applying pulsating electrical potential between the said electrodes whereby an electrostatic charge is accumulated on one electrode and discharged through the plastic film to the other electrode. The treatment is carried out continuously at an intensity determined by the rate of treatment and by the degree of treatment sought to be effected.

Numerous pressure sensitive adhesive compositions can be employed as the adhesive component of the tapes of this invention. One very good class of adhesives is represented by those based upon copolymers of ethylene and vinyl acetate, e.g. those containing about 71 to 73% ethylene and having a melt flow between about 12 and 28. When formulated with properly selected tackifying and plasticizing agents, excellent hot melt adhesives can be prepared based upon these copolymers. A preferred hot melt adhesive is one containing about 40 to 55 parts by weight ethylene-vinyl acetate copolymer, 45 to 60 parts by weight of glycerine ester of hydrogenated wood rosin, and 0 to 15 parts by weight of triethylene glycol ester of hydrogenated wood rosin.

Other thermoplastic materials useful for forming pressure sensitive hot melt adhesives include ethylene-ethylacrylate copolymers, other ethylene-vinyl acetate copolymer compositions, and ethylene-vinyl butyrate copolymers.

In the example below, pressure sensitive tape according to the instant invention is exemplified. Parts and percentages are by weight unless otherwise specifically indicated.

EXAMPLE 1

A film of high density polyethylene having a molecular weight of about 1,000,000 and being about 4½ inches wide by 10.0 mils thick was subjected to corona discharge treatment at 1700 watts and 1.25 amps. at a rate of 50 ft./minute.

A hot melt adhesive composition was prepared by melting 55 parts of glycerine ester of hydrogenated wood rosin at 350° F. and adding thereto, with stirring, 45 parts of a copolymer of ethylene and vinyl acetate containing about 28% vinyl acetate and whose melt flow according to ASTM D–1238 ($I_{10}$, 190° C.) was 25. When these ingredients were thoroughly mixed, 1 part of the triethylene glycol ester of hydrogenated wood rosin was added and mixed thoroughly.

The hot melt adhesive was applied to the film at a temperature of about 375° F. at about 25 ft./minute by conventional roll coating. No melting or distortion of the film was observed during the time the film was in contact with the coating roll. Residence time on the roll was about 2 seconds. Coating thickness of about 1 mil resulted. Immediately upon leaving the coating station, the coating was chilled to set it and a silicon release paper was laminated to the coated side of the tape to facilitate unwinding thereof. The resulting tape had a coating about 1 mil in thickness and adhered well to aluminum, stainless steel, cold rolled steel and chrome plate.

Abrasion resistance of this tape was determined according to the method set forth in ASTM D1044.

What I claim and desire to protect by Letters Patent is:

1. Pressure sensitive adhesive tape comprising a substrate of high density polyethylene having a molecular weight of at least about 1,000,000 coated with a pressure sensitive hot melt adhesive.

2. The tape of claim 1 where the film is treated with high voltage corona discharge to make it receptive to the adhesive coating.

3. The tape of claim 1 where the adhesive is a thermoplastic composition comprising about 45 to 60 parts by weight of the glycerine ester of hydrogenated wood rosin, about 0 to 15 parts by weight of the triethylene glycol ester of hydrogenated wood rosin, and about 40 to 55 parts by weight of a copolymer of ethylene and vinyl acetate containing about 71 to 73% ethylene by weight and having a melt flow ($I_{10}$, 190° C.) between 12 and 28.

4. In the process of preparing pressure sensitive adhesive tape wherein a hot melt adhesive is applied to a polyethylene backing at a temperature greater than the softening point of the backing, the improvement which comprises applying said hot melt adhesive to high density polyethylene having molecular weight greater than about 1,000,000.

5. The process of claim 4 where the high density polyethylene substrate has been treated with high voltage corona discharge prior to application of the hot melt coating.

References Cited

UNITED STATES PATENTS

| | | | |
|---|---|---|---|
| 2,647,843 | 8/1953 | Bemmels | 117—122 |
| 2,790,732 | 4/1957 | McGarry et al. | 117—122 |
| 2,876,358 | 3/1959 | Root | 117—138.8 X |
| 3,025,167 | 3/1962 | Butler | 117—122 X |
| 3,281,259 | 10/1966 | Lux et al. | 117—138.8 X |
| 3,322,553 | 5/1967 | Seifried et al. | 117—122 X |
| 3,326,708 | 6/1967 | Hawkins | 117—122 X |
| 3,340,092 | 9/1967 | Craver et al. | 117—122 X |
| 3,342,902 | 9/1967 | Peterkin | 117—122 X |

WILLIAM D. MARTIN, *Primary Examiner.*

B. D. PIANALTO, *Assistant Examiner.*

U.S. Cl. X.R.

117—93.1, 122, 138.8, 161